US008537007B2

(12) United States Patent
Sima et al.

(10) Patent No.: US 8,537,007 B2
(45) Date of Patent: Sep. 17, 2013

(54) AUTOACCRETING DATABASE FOR EAS-RF APPLICATIONS

(75) Inventors: Bogdan Sima, Sewell, NJ (US); Robert D. Herder, Franklinville, NJ (US); Michael L. Reeves, Philadelphia, PA (US)

(73) Assignee: Checkpoint Systems, Inc., Thorofare, NJ (US)

( * ) Notice: Subject to any disclaimer, the term of this patent is extended or adjusted under 35 U.S.C. 154(b) by 289 days.

(21) Appl. No.: 13/047,978

(22) Filed: Mar. 15, 2011

(65) Prior Publication Data

US 2011/0248848 A1 Oct. 13, 2011

Related U.S. Application Data

(60) Provisional application No. 61/321,929, filed on Apr. 8, 2010.

(51) Int. Cl.
*G08B 21/00* (2006.01)
*H04Q 5/22* (2006.01)

(52) U.S. Cl.
USPC ..................... 340/540; 340/572.1; 340/572.3; 340/572.4

(58) Field of Classification Search
USPC ............... 340/540, 10.1, 572.1, 572.2, 572.3, 340/572.4; 235/375, 378, 385, 435, 462.01
See application file for complete search history.

(56) References Cited

U.S. PATENT DOCUMENTS

| | | | |
|---|---|---|---|
| 5,382,784 | A | 1/1995 | Eberhardt |
| 6,056,199 | A | 5/2000 | Wiklof et al. |
| 6,109,526 | A | 8/2000 | Ohanian et al. |
| 6,246,326 | B1 | 6/2001 | Wiklof et al. |
| 6,318,631 | B1 | 11/2001 | Halperin |
| 6,371,375 | B1 | 4/2002 | Ackley et al. |
| 6,379,058 | B1 | 4/2002 | Petteruti et al. |
| 6,415,978 | B1 | 7/2002 | McAllister |
| 6,512,478 | B1 | 1/2003 | Chien |
| 6,830,181 | B1 | 12/2004 | Bennett |

(Continued)

FOREIGN PATENT DOCUMENTS

| | | | |
|---|---|---|---|
| EP | 0933741 | A2 | 4/1999 |
| EP | 0933741 | A3 | 8/1999 |
| GB | 2286275 | A | 8/1995 |

OTHER PUBLICATIONS

PCT International Search Report dated Mar. 17, 2011 and Written Opinion of the International Authority.

*Primary Examiner* — Toan N Pham

(74) *Attorney, Agent, or Firm* — Caesar, Rivise, Bernstein, Cohen & Pokotilow, Ltd.

(57) ABSTRACT

A method for entering information regarding monitored items into a database in a security tag system includes reading barcode item information from a barcode associated with a monitored item, determining whether a tag is present with the monitored item to provide tag presence information, and storing the barcode item information and the tag presence information into the database. The barcode item information and the tag presence information are associated with each other in the database to provide item association information. A rule regarding whether a tag should be present when the barcode associated with the monitored item is read is determined in accordance with the item association information and the tag is deactivated in accordance with the rule. An alarm condition is raised in accordance with the rule. The alarm condition is raised if the tag is present and the rule indicates that the tag should not be present.

19 Claims, 4 Drawing Sheets

(56) References Cited

U.S. PATENT DOCUMENTS

| | | | | |
|---|---|---|---|---|
| 6,899,476 | B1 | 5/2005 | Barrus et al. | |
| 7,009,561 | B2 | 3/2006 | Menache et al. | |
| 7,019,650 | B2 | 3/2006 | Volpi et al. | |
| 7,066,667 | B2 | 6/2006 | Chapman et al. | |
| 7,161,489 | B2 | 1/2007 | Sullivan et al. | |
| 7,187,288 | B2 | 3/2007 | Mendolia et al. | |
| 7,278,571 | B2 | 10/2007 | Schmidtberg et al. | |
| 7,320,432 | B2 | 1/2008 | Sureaud et al. | |
| 7,321,296 | B2 | 1/2008 | Engellenner | |
| 7,353,997 | B2 | 4/2008 | Tikhov et al. | |
| 7,378,967 | B2 | 5/2008 | Sullivan et al. | |
| 7,403,120 | B2 | 7/2008 | Duron et al. | |
| 7,411,551 | B2 | 8/2008 | Choi et al. | |
| 7,432,810 | B2 | 10/2008 | Menache et al. | |
| 7,443,298 | B2 | 10/2008 | Cole et al. | |
| 7,501,948 | B2 | 3/2009 | Roemerman et al. | |
| 7,527,198 | B2 * | 5/2009 | Salim et al. | 235/385 |
| 7,551,087 | B2 | 6/2009 | McAllister | |
| 2002/0019702 | A1 | 2/2002 | Nysen | |
| 2003/0197611 | A1 * | 10/2003 | Clifford et al. | 340/572.1 |
| 2003/0234288 | A1 * | 12/2003 | Canipe et al. | 235/383 |
| 2004/0074964 | A1 | 4/2004 | Falkenrich-Wesche | |
| 2005/0219053 | A1 * | 10/2005 | Clifford et al. | 340/572.4 |
| 2006/0022800 | A1 | 2/2006 | Krishna et al. | |
| 2006/0049947 | A1 * | 3/2006 | Forster | 340/572.3 |
| 2006/0077036 | A1 | 4/2006 | Roemerman et al. | |
| 2006/0170565 | A1 | 8/2006 | Husak et al. | |
| 2006/0232412 | A1 | 10/2006 | Tabacman et al. | |
| 2007/0125836 | A1 | 6/2007 | McAllister et al. | |
| 2007/0159400 | A1 | 7/2007 | DeJean et al. | |
| 2008/0012710 | A1 | 1/2008 | Sadr | |
| 2008/0068265 | A1 | 3/2008 | Kalliola et al. | |
| 2008/0157972 | A1 | 7/2008 | Duron et al. | |
| 2008/0242240 | A1 | 10/2008 | Rofougaran et al. | |
| 2008/0318632 | A1 | 12/2008 | Rofougaran et al. | |

* cited by examiner

AUTOACCRETING DATABASE FOR EAS-RF APPLICATIONS

BACKGROUND OF THE INVENTION

1. Field of Invention

This invention relates to security tags and, more particularly, to a system for entering information associated with tagged items into a database.

2. Description of Related Art

It is well known to combine a barcode reader and a tag reader in a security tag system. For example, U.S. Pat. Nos. 5,382,784, 6,371,375, 6,415,978, 7,320,432 and 7,353,997 teach such combination devices. These combination devices can be used for purposes such as identifying and separating items when items having barcodes and items having tags have been intermingled. They can also be used for triggering a tag read when a valid barcode detection indicates the presence of an attached item.

It is also known to use combination barcode readers and tag readers in systems including tags that are provided with memory suitable for programming. In this art, information associated with items can be read from a barcode, and programmed into the memory within the tags by the combination devices. It is also known to modify the data read from the barcode in a predetermined manner prior to programming it into the tags. Alternately, the information to be programmed into a tag, or modified and then programmed into the tag, can be obtained from a database in response to reading the identity of the item from the barcode. Examples of such combination devices for programming the memories of security tags according to information encoded in barcodes and/or databases include U.S. Pat. Nos. 6,056,199, 6,318,631, 6,830,181 and 7,066,667.

More specifically, U.S. Pat. No. 7,551,087 issued to McAllister, discloses an integrated hand held device that combines an optical barcode reader and an RFID transponder commissioning device. The hand held device scans the barcode and receives data from the barcode. The received data can then be correlated with previously known information stored in a database.

The hand held device in the McAllister system can communicate with the database wirelessly, or the database can be downloaded and stored in the hand held device. If the received data correlates with information in the database, it is validated. When the information is validated it is written into a corresponding RFID transponder, which is thereby commissioned. The commissioning of the transponder can be recorded in the database.

U.S. Patent Pub. No. 2004/0074964, filed by Falkenrich-Wesche on Oct. 22, 2002, discloses writing into tags as tagged items proceed through a process in order to follow the items through the process. Information regarding each operation performed on the item during the process is stored in the tag and in a database.

U.S. Pat. No. 7,501,948, issued to Roemerman, and having a priority date of Sep. 29, 2004, discloses an RFID system including a database having prior knowledge of tagged objects. The Roemerman system obtains additional information about the objects when the tags are read. For example, the system can obtain information regarding the location of the object, or information regarding the presence of other tagged items in the vicinity of the object. The additional information can be stored in the database. Histories of the tagged object are built based on the knowledge in the database. The histories built in the database can include histories of the locations and movements of the objects, and histories of the relationships between the objects.

In addition to the references disclosing the foregoing combination devices, several references disclose the use of RF signatures of objects for detecting the presence of the objects. U.S. Pat. No. 7,019,650, issued to Volpi, teaches detecting the presence of a metal object using a metal sensing subsystem to provide a signature signal representative of the object. The signature signal is filtered, processed and recognized when present. U.S. Patent Pub. No. 2009/0160605 discloses distinguishing the RFID signatures of products from the RFID signatures of unwanted items. U.S. Patent Pub. No. 2007/0159400 teaches providing credit cards with unique electromagnetic fingerprints, and authenticating the credit cards in response to detecting their fingerprints.

All references cited herein are incorporated herein by reference in their entireties.

BRIEF SUMMARY OF THE INVENTION

A method for entering information regarding monitored items into a database in a security tag system includes reading barcode item information from a barcode associated with a monitored item, determining whether a tag is present with the monitored item to provide tag presence information, and storing the barcode item information and the tag presence information into the database. The barcode item information and the tag presence information are associated with each other in the database to provide item association information in the association database. A rule regarding whether a tag should be present when the barcode associated with the monitored item is read is determined in accordance with the item association information and the tag is deactivated in accordance with the rule. An alarm condition is raised in accordance with the rule. The alarm condition is raised if the tag is present and the rule indicates that the tag should not be present. A plurality of readings of the barcode item information of the monitored item are performed, and a plurality of determinations whether a tag is present with the monitored item to provide further item association information are performed. The rule is changed in accordance with the further item association information to provide a changed rule. The tag is deactivated in accordance with the changed rule. A determination is made whether to confirm or change the rule in accordance with a percentage of times a tag is present with the monitored item. The percentage is varied.

A determination is made whether to confirm or change a rule in accordance with a threshold number of times the barcode of the monitored item is read. The threshold number of times the barcode of the monitored item is read is varied. A temporary rule is made in accordance with a first reading of the barcode item information. The temporary rule can be that the tag should be present for all items. The rule can be reevaluated periodically. The rule can be reevaluated continuously.

New Stock Keeping Unit (SKU) information is stored in a database using deactivation events at a Point of Sale (POS) device including a barcode reader, a tag reader and a tag deactivator. The tag reader and the tag deactivator can be provided in the same physical device. The barcode reader can read a barcode attached to the item containing the SKU information of the item. The tag reader can read a tag that is also attached to the item, and turn on the deactivation pad for deactivating the tag. When the tag is read and deactivated in this manner, a deactivation event is created. In response to the deactivation event, information regarding the association between the barcode and the tag can be automatically entered by the invention into a database associated with the system of the invention.

In this manner, associations between the SKUs of a large number of items and their tags can be added to the association database, without the need for any separate database entry operations. The elimination of data entry time can avoid significant expenses, for example when new items are added to an inventory. This can be especially useful in cases where the system of the invention does not have access to any POS database which may contain information about such associations between SKUs and tags. The invention can be applied most advantageously in such systems where access to a POS database is not available.

In one embodiment of the invention a tag security system includes an association database for receiving and storing (i) barcode item information from a barcode of a monitored item and (ii) tag presence information representative of whether a tag is present with the monitored item. Item association information representative of an association between the barcode item information and the tag presence information is also stored in the association database. A rule is determined in the association database in accordance with the item association information and representative of whether a tag should be present when barcode item information is received. The tag is deactivated in accordance with the rule. An alarm condition is raised in accordance with the rule. A plurality of readings of the barcode item information of the monitored item and a plurality of determinations whether a tag is present with the monitored item provide further item association information.

The invention can help prevent sweethearting arrangements in which POS personnel can cooperate with customers in defrauding a retail establishment. In one type of sweethearting arrangement the POS personnel can scan the tag of a less expensive item in order to ring up a smaller purchase price, thereby turning the tag deactivator pad on. The POS personnel can then deactivate a tag attached to a more expensive item following behind the less expensive item in sequence. The deactivator can then see the second tag and refuse to deactivate it. This and other fraudulent arrangements can be detected when associations between the tags and the SKUs of the items are already stored in the database by the system and method of the invention. A warning flag can be raised if the SKU information associated with the barcode does not agree with the information associated with the tag.

Additionally, the tag reader of the invention can detect and record the RF signatures of the items attached to the tags and store the RF signatures into the database. The system and method of the invention can then teach the database to associate the RF signature information with the SKU and make a decision whether to deactivate or not deactivate. The signature information in the database can then be compared with future signature readings when the same SKU is detected.

BRIEF DESCRIPTION OF SEVERAL VIEWS OF THE DRAWINGS

The invention will be described in conjunction with the following drawings in which like reference numerals designate like elements and wherein.

DETAILED DESCRIPTION OF THE INVENTION

Figure 1:
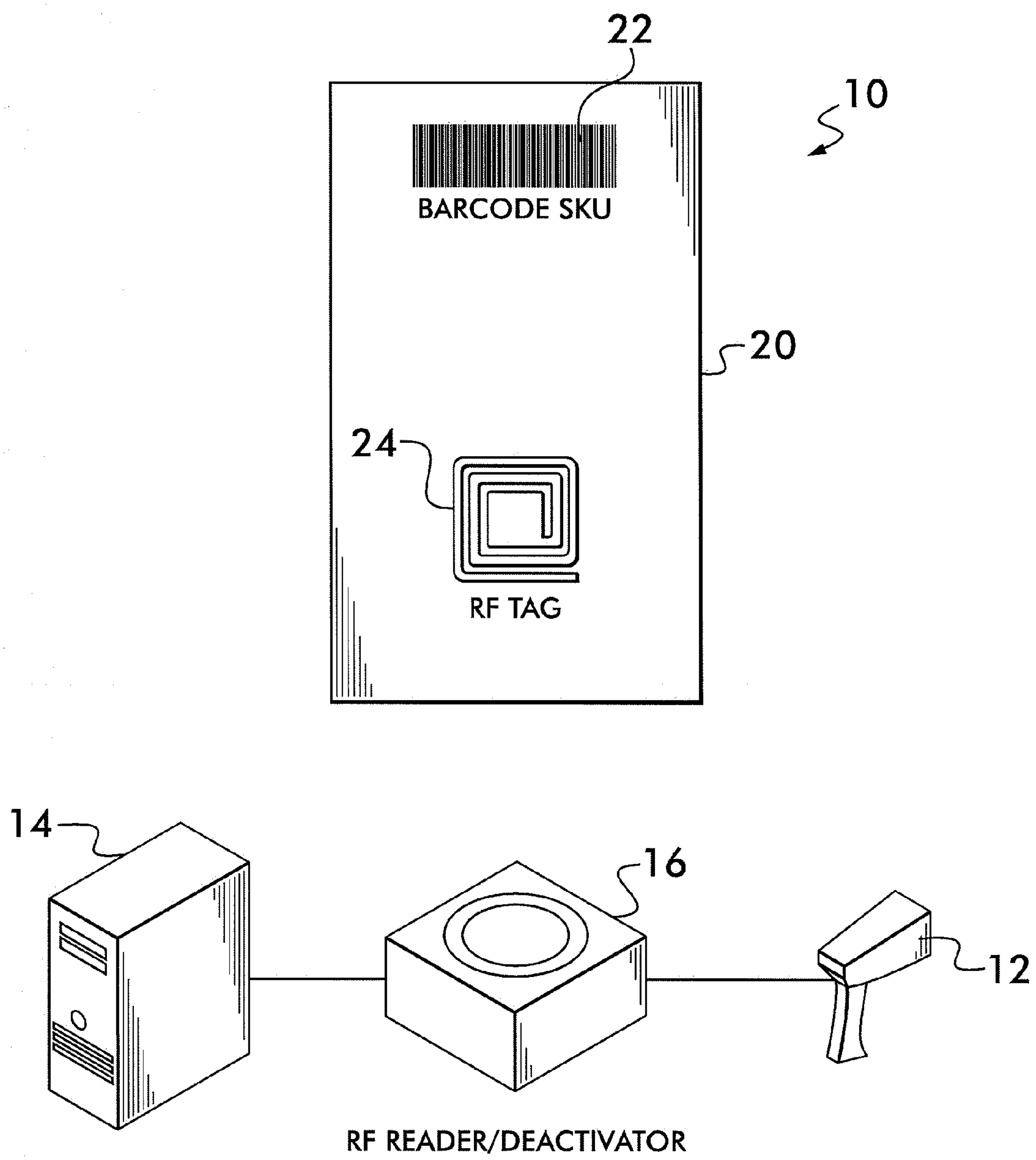
FIG. 1 shows a schematic representation of the autoaccreting database system of the present invention.

Referring now to FIG. 1, there is shown the autoaccreting database system 10 of the invention. The autoaccreting database system 10 includes a barcode scanner 12 for reading a barcode 22 associated with an item to be monitored. The autoaccreting database system 10 also includes a RF reader/deactivator 16 coupled to the barcode scanner 12 for reading and deactivating a tag 24. The tag 24 can also be associated with the item to be monitored. The RF reader/deactivator 16 can be coupled to a computing device 14. The computing device 14 can be any type of computing device, such as a personal computer or a server. The computing device 14 can be hardwired to the RF reader/deactivator 16, or it can be coupled to the RF reader/deactivator 16 wirelessly, by way of LAN, a WAN, the internet, or in any other manner. The barcode scanner 12 and RF reader/deactivator 16 can be located at a POS of the retail establishment in order to process items to be monitored at the time of checkout.

Preferably, the barcode 22 and the tag 24 are individually attached to the items to be monitored within the retail establishment. In an alternate embodiment however they can be attached to a single label 20, which can be attached to the item to be monitored. In a preferred embodiment the capability of the barcode reader 12 and the capability of the RF reader/deactivator 16 can all be provided as a single combination device. Additionally, a separate RF reader device and a separate deactivator pad can be used in the autoaccreting database system 10, rather than a combination device such as the RF reader/deactivator 16.

Figure 2:
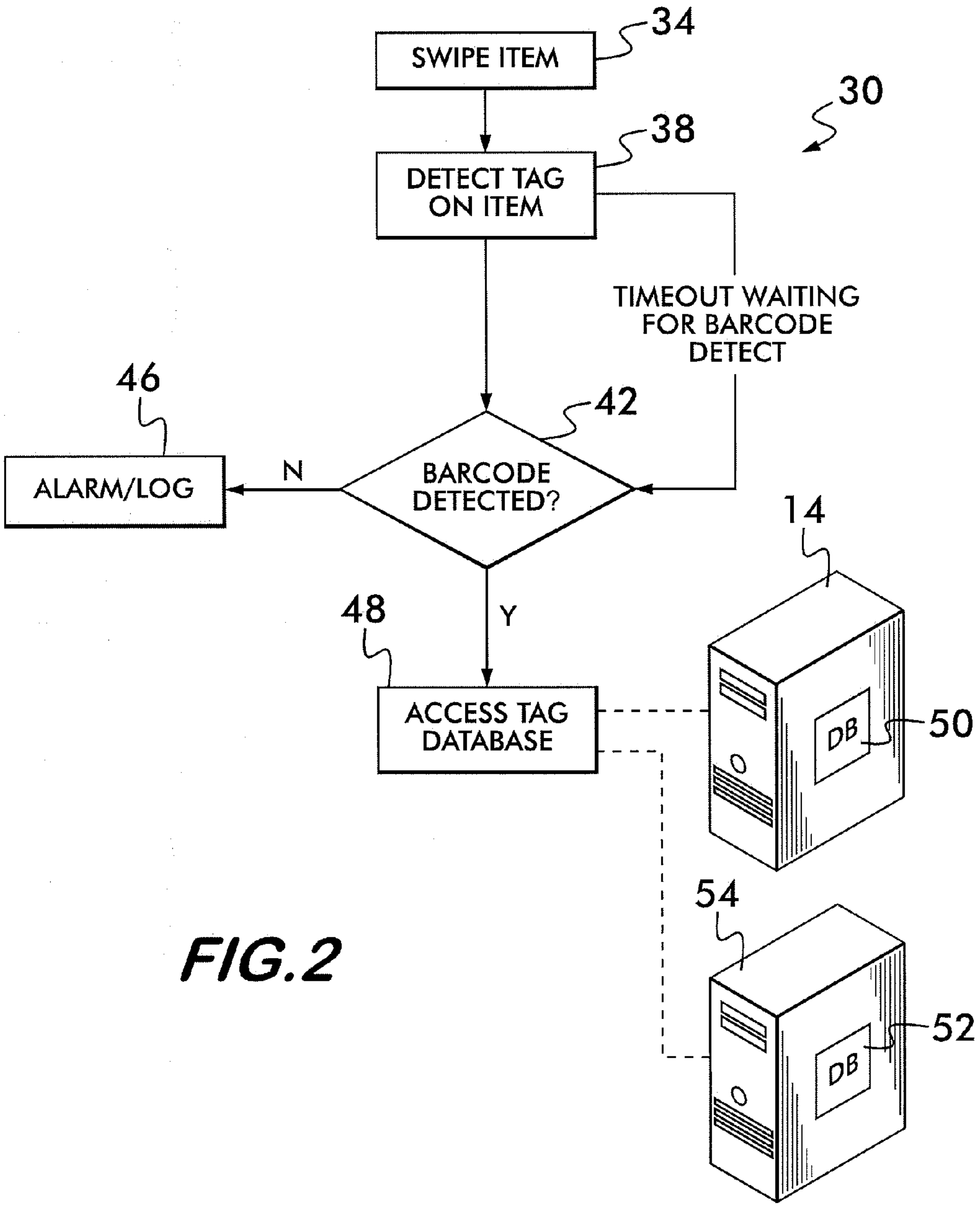
FIG. 2 shows a flow chart representation of an embodiment of the autoaccreting database algorithm of the present invention suitable for operation within the autoaccreting database system of FIG. 1.

Referring now to FIG. 2, there is shown a flow chart representation of the autoaccreting database algorithm 30. The autoaccreting database algorithm 30 can operate within the autoaccreting database system 10 to help the system of the invention learn whether tags 24 are associated with the barcodes 22 attached to the items being monitored within the retail establishment. The associations learned by the autoaccreting database algorithm 30 can be stored in a tag association database 50 for later use, for example in theft detection and in inventory control.

Additionally, the learned associations can be used by the system of the invention to determine whether to energize a deactivator pad within the RF reader/deactivator 16 in order to deactivate a tag 24 when items identified by their barcodes 22 are processed at the POS. Thus, if a query of the tag association database 50 storing the associations determines that a barcode 22 detected at the POS checkout has a tag 24 associated with it, the deactivator pad can be energized. Additionally, querying a tag association database 50 storing these associations can be useful in deterring theft in a number of ways. For example, the associations can be useful for determining whether a tag 24 has been removed from an item, since the detection of a barcode 22 with no detection of a tag 24 when a tag 24 should be present, can trigger an alarm condition. Furthermore, these associations can be useful in determining whether tags 24 have been switched on items, since the detection of the wrong tag 24 along with a barcode 22 can also trigger an alarm condition if using tag frequency determination.

A tag association database 50 in the system and method of the invention can start with few or no known associations between barcodes 22 and tags 24 for the items at a retail establishment, and learn the associations by detecting and recording the results of a predetermined number of swipes of the items. Probabilistic rules are created based on the recorded results. For example, in one embodiment a rule can be based upon the first ten times the barcode 22 of an item is encountered. If a tag 24 is detected during fifty percent or more of the first ten swipes of the item, the system can establish the rule that a tag 24 should be associated with the barcode 22. The number of swipes of an item required to create a rule, and the percentage of detects of the tag 24 required to create a rule, can be varied in any manner desired by those skilled in the art.

Additionally, the percentage of detects can be recalculated at any time, and the rule can be changed at any time, according to the recalculations. For example, if it is determined that a tag 24 should be present with a barcode 22, and the percentage of tag detections for the item falls below a predetermined level after a predetermined number of additional swipes, it can then be determined that a tag 24 should not be associated with the barcode 22. If it is determined that a tag 24 should not be present with a barcode 22, and the percentage of tag detections for the item rises above a predetermined level, it can be determined that a tag 24 should be associated with the barcode 22. In this manner, after a large enough number of swipes of the items to be monitored at the retail establishment, there will be an accretion of associations between the barcodes 22 and the tags 24 in the tag association database 50.

Therefore, within the autoaccreting database algorithm 30 of FIG. 2, an item is swiped along the barcode scanner 12 and the RF reader/deactivator 16, as shown in block 34. The swiped item can have a barcode such as the barcode 22 and/or a tag such as the tag 24. If the item has both a barcode 22 and a tag 24, one of the barcode 22 or the tag 24 is detected before the other. The autoaccreting database algorithm 30 covers the case where the tag 24 is detected before the barcode 22, as shown in block 38.

When the presence of a tag 24 is detected before a barcode 22 a tag detect flag is set, a timer is started, and a determination is made whether a barcode 22 is detected before the timer expires, as shown in decision 42. In one embodiment, if a barcode 22 is not detected before the timer expires, execution can proceed to block 46, where an alarm condition can be logged, since the items swiped in block 34 can be expected to have barcodes 22. If a barcode 22 is detected before the timer expires, as determined at decision 42, the tag database 50 is accessed, as shown in access tag database block 48. The access of the tag database 50 is discussed in more detail below.

In a preferred embodiment of the invention, the tag database 50 queried in block 48 can be located on the computing device 14. However, in alternate embodiments, the tag database 50 can be located anywhere. Furthermore, the tag database 50 can be accessed by way of a hardwired connection, a wireless connection, an internet connection, or any other type of connection. Additionally, in one possible embodiment, a tag database 52 located on a POS computing device 54 can be accessed in block 48. The POS computing device 54 can be located in the POS establishment or anywhere else, and can communicate with the autoaccreting database system 10 in any manner. The POS tag database 52 may have information regarding associations between tags 24 and barcodes 22. Furthermore, the system and method of the invention can alternately query both tag databases 50, 52.

Figure 3:
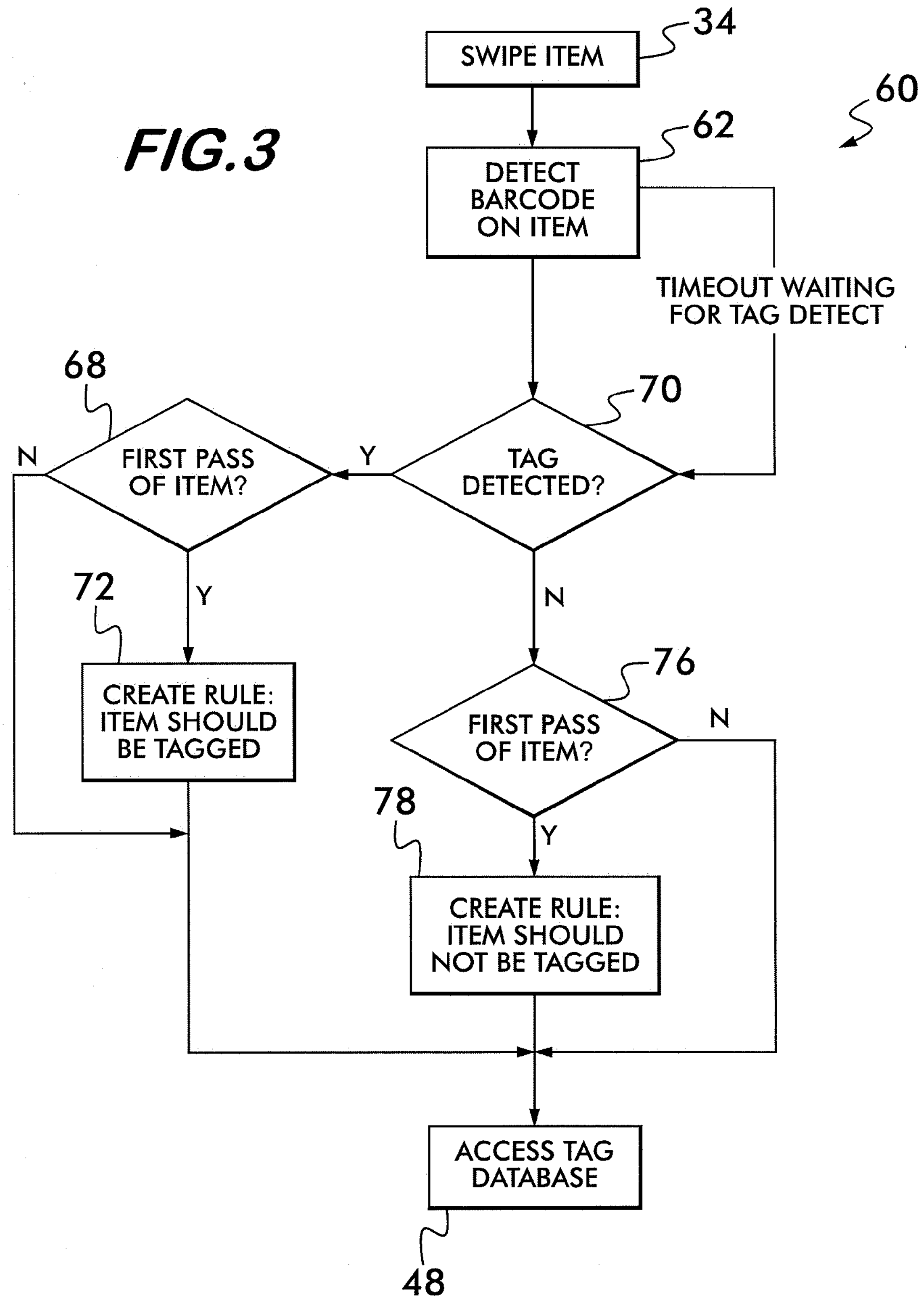
FIG. 3 shows a flow chart representation of an alternate embodiment of the autoaccreting database algorithm of FIG. 2.

Referring now to FIG. 3, there is shown the autoaccreting database algorithm 60. The autoaccreting database algorithm 60 is an alternate embodiment of the autoaccreting database algorithm 30. In the autoaccreting database algorithm 60 the item having a barcode 22 and/or a tag 24 is swiped along the barcode scanner 12 and RF reader/deactivator 16, as shown in block 34. When the item is swiped one of the barcode 22 or the tag 24 is detected before the other. The autoaccreting database algorithm 60 covers the case where the barcode 22 is detected first, as shown in block 62. When the barcode 22 is detected a timer is started, and a determination is made at decision 70 whether a tag 24 is detected before the timer expires.

As previously described, the system and method of the invention can create a rule for an item after a predetermined number of swipes of the item. The rule can be that there should be a tag 24 associated with a detected barcode 22, and that the pad in the deactivator 16 should be energized when the barcode 22 is detected. Alternately, the rule can be that there should not be a tag 24 associated with a barcode 22, and that the pad in the deactivator 16 should not be energized when the barcode 22 is detected. In a one embodiment of the invention, the rule can be a temporary rule created the first time a barcode 22 is detected. The temporary rule can then be confirmed or replaced when a predetermined number of additional swipes of the item have occurred.

Accordingly, if a tag 24 is detected at decision 70 before the timer expires, a tag detect flag can be set and execution of the autoaccreting database algorithm 60 can proceed to decision 68. In decision 68 a determination can be made whether the current swipe of the item is the first time the item has been swiped. If the current swipe is the first time the item has been swiped, the autoaccreting database algorithm 60 can create a temporary rule. Since a tag 24 was detected in decision 70, the temporary rule created in block 72 is that the item is supposed to have a tag 24. This rule can be changed at a later time if necessary, after the predetermined number of swipes of the item has occurred.

If a tag 24 is not detected before the timer expires, execution can proceed from decision 70 to decision 76, where a determination can be made whether the current swipe of the item is the first time the item has been swiped. If the current swipe is the first time the item has been swiped, the autoaccreting database algorithm 60 can create a temporary rule in block 78. Since a tag 24 was not detected in decision 70, the temporary rule created in block 78 is that the item should not have a tag 24. This rule can be changed if necessary, after the predetermined number of swipes of the item has occurred.

Regardless of which rule is created the first time an item is swiped, execution of the autoaccreting database algorithm 60 proceeds to access tag database block 48 where the rule is recorded in the tag database 50. Additionally, after the first time the item is swiped, execution of the autoaccreting database algorithm 60 proceeds by way of decisions 68, 76 directly to access tag database block 48, where the association between the barcode 22 and a tag 24 (or the lack of an association) can be recorded in the tag database 50.

In an alternate embodiment, it could be decided that it is important to never fail to deactivate a tag 24. Under these circumstances, it would be important not to make a rule that the barcode 22 of an item should not have a tag 24, until it is clear that the rule is true. For example, the path through the decision 76 and block 78 of the autoaccreting database algorithm 60 can be eliminated, and the system would always start with the rule that a tag 24 should be associated with a barcode 22 in block 72.

Figure 4:
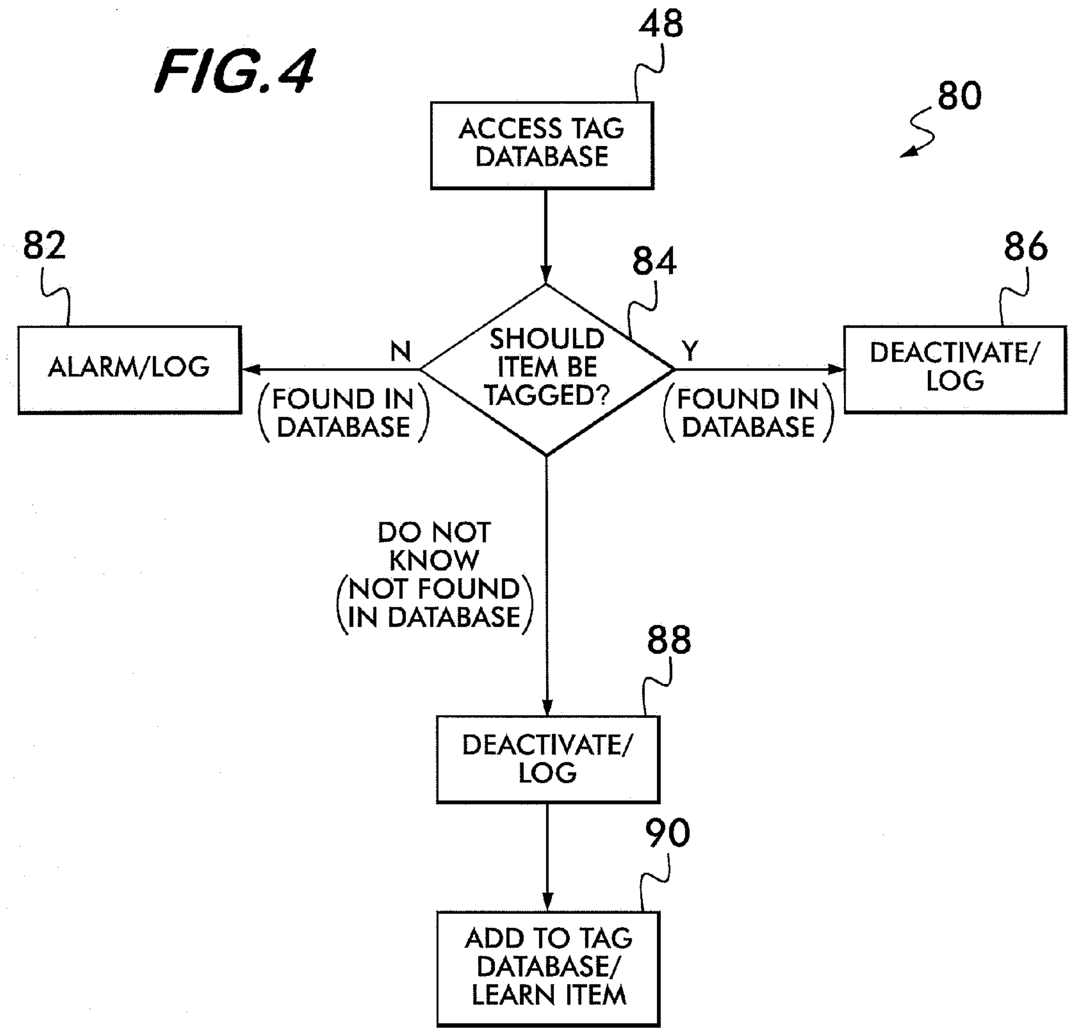
FIG. 4 shows a flow chart representation of a further embodiment of the autoaccreting database algorithm of the present invention.

Referring now to FIG. 4, there is shown the autoaccreting database algorithm 80. Execution proceeds to the autoaccreting database algorithm 80 by way of either of the autoaccreting database algorithms 30, 60, depending on whether the tag 24 or the barcode 22 is detected first when an item is swiped. In the autoaccreting database algorithm 80 the tag database 50 is accessed as shown in block 48. A determination is made in decision 84 whether the swiped items should have a tag 24. This determination is made according to the barcodes 22 associated with the items, and the rules stored in the tag database 50.

As previously described, the rules may have been established when the items are swiped a predetermined number of times. Furthermore, the rules may be temporary rules that can be evaluated and changed if necessary. One skilled in the art may want all of the barcodes 22 to start with a rule that they are associated with a tag 24, or all of the barcodes 22 to start with a rule that they are not associated with a tag 24. Starting rules can be created within the autoaccreting database algorithm 60, as previously described. In any event, the rules can be reevaluated and changed at any time if necessary. The reevaluation of the rules can be performed on an ongoing basis, or it can be performed periodically. Rules can be reversed as soon as the calculated percentages of tag detects for an item go above or below predetermined values. Additionally, the number of swipes required to evaluate whether a tag 24 is associated with a barcode 22 can be any number, and the number of swipes required can vary for different items. Furthermore, the percentage of swipes needed to make a rule or reverse a rule can vary in any manner.

If the item should have a tag 24, as determined by querying the tag database 50 in decision 84, and the tag detect flag is set, a deactivation event occurs, as shown in block 86. When a deactivation event occurs the deactivator pad in the RF reader/deactivator 16 is energized in order deactivate the tag 24, and the deactivation event is logged. If the item should not have a tag 24, as determined by querying the tag database 50 in decision 84, and the tag detect flag is set, an alarm condition can be raised and logged, as shown in block 82.

It is possible that a barcode 22 read by the barcode scanner 12 may not be found in the tag database 50. Under these circumstances, in one embodiment of the invention, the deactivator pad in the RF reader/deactivator 16 can be energized to deactivate any tag 24 that may be present, as shown in block 88. This can avoid setting off an alarm when a customer leaves the store. The deactivation event can be logged and the swiped item can entered into the tag database 50 as shown in block 90.

The circuitry for performing the operations of the invention can include conventional microprocessors and memories. It can be located within a tag reader, within a computing device such as the computing device 14, or at any other convenient location.

While the invention has been described in detail and with reference to specific examples thereof, it will be apparent to one skilled in the art that various changes and modifications can be made therein without departing from the spirit and scope thereof.

What is claimed is:

1. A tag security system having a computing device, comprising:

a database coupled to the computing device, the database for receiving and storing (i) barcode item information from a barcode of a monitored item and (ii) tag presence information representative of whether a tag is present with the monitored item;

item association information stored in the database by the computing device, wherein the item association information is representative of an association between the barcode item information and the tag presence information; and a rule regarding whether a tag should be present when barcode item information is received, wherein the rule is determined by the computing device in accordance with the item association information stored in the database.

2. The tag security system of claim 1, wherein the tag is deactivated in accordance with the rule.

3. The tag security system of claim 1, further comprising an alarm condition raised in accordance with the rule.

4. The tag security system of claim 1, further comprising a plurality of readings of the barcode item information of the monitored item and a plurality of determinations whether a tag is present with the monitored item to provide further item association information.

5. The tag security system of claim 4, further comprising a changed rule wherein the changed rule is changed in accordance with the further item association information.

6. The tag security system of claim 5, further comprising a deactivation of the tag in accordance with the changed rule.

7. The tag security system of claim 5, further comprising a determination whether to confirm or change a rule in accordance with a threshold number of times the tag is determined to be present with the monitored item.

8. The tag security system of claim 4, further comprising a temporary rule determined in accordance with a first reading of the barcode item information of the monitored item and a first determination whether a tag is present with the monitored item.

9. The tag security system of claim 1, further comprising reevaluating the rule periodically.

10. The tag security system of claim 1, wherein the barcode item information comprises item SKU information.

11. The tag security system of claim 1, further comprising a POS database accessed by the database.

12. A method for entering information regarding monitored items in a security tag system having a computing device, comprising:

receiving barcode item information into a database from a barcode of a monitored item;

receiving tag presence information into the database representative of whether a tag is present with the monitored item;

associating the barcode item information and the tag presence information with each other in the database by the computing device to provide item association information; and forming a rule based on said received bar code information and said received tag presence information.

13. The method for entering information of claim 12, further comprising deactivating the tag in accordance with the rule in the database determined in accordance with the item association information and representative of whether a tag should be present when the barcode of the monitored item is received.

14. The method for entering information of claim 13, further comprising receiving a plurality of readings of barcode item information of the monitored item and a plurality of readings of tag presence information to provide further item association information.

15. The method for entering information of claim 14, further comprising changing the rule in accordance with the further item association information to provide a changed rule in accordance with the further item association information.

16. The method for entering information of claim 14, further comprising creating a temporary rule in accordance with a first reading of the barcode item information.

17. The method for entering information of claim 13, further comprising reevaluating the rule periodically.

18. The method for entering information of claim 13, further comprising reevaluating the rule continuously.

19. The method for entering information of claim 12, further comprising accessing a POS database by the database.

* * * * *